Nov. 6, 1945.                M. JENSEN                2,388,485
            METHOD OF MAKING AIRPLANE STRUCTURES
                  Filed Sept. 20, 1941      7 Sheets-Sheet 1
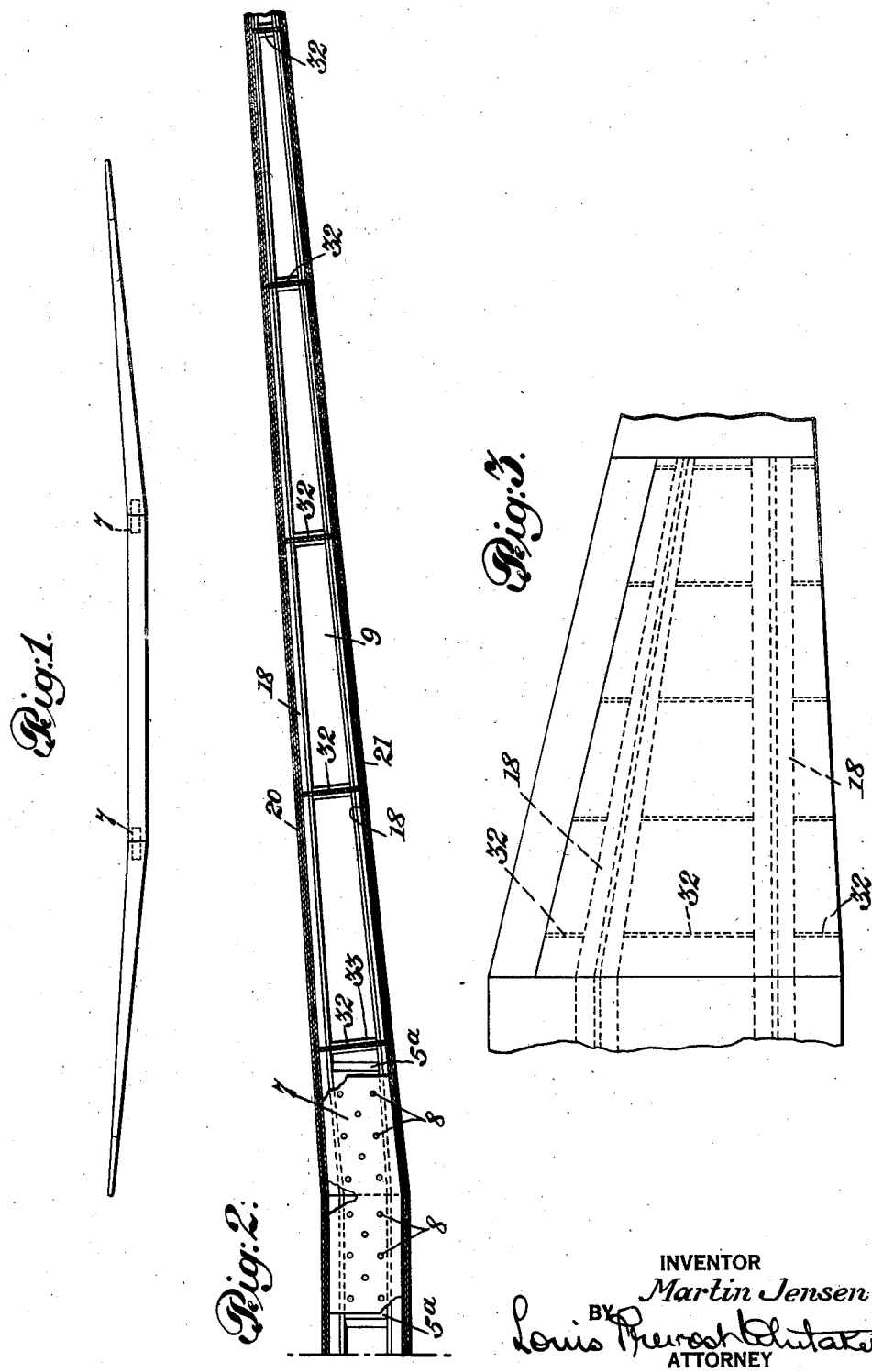
INVENTOR
Martin Jensen
BY
Louis Prevost Whitaker
ATTORNEY Nov. 6, 1945. M. JENSEN 2,388,485
METHOD OF MAKING AIRPLANE STRUCTURES
Filed Sept. 20, 1941 7 Sheets-Sheet 2
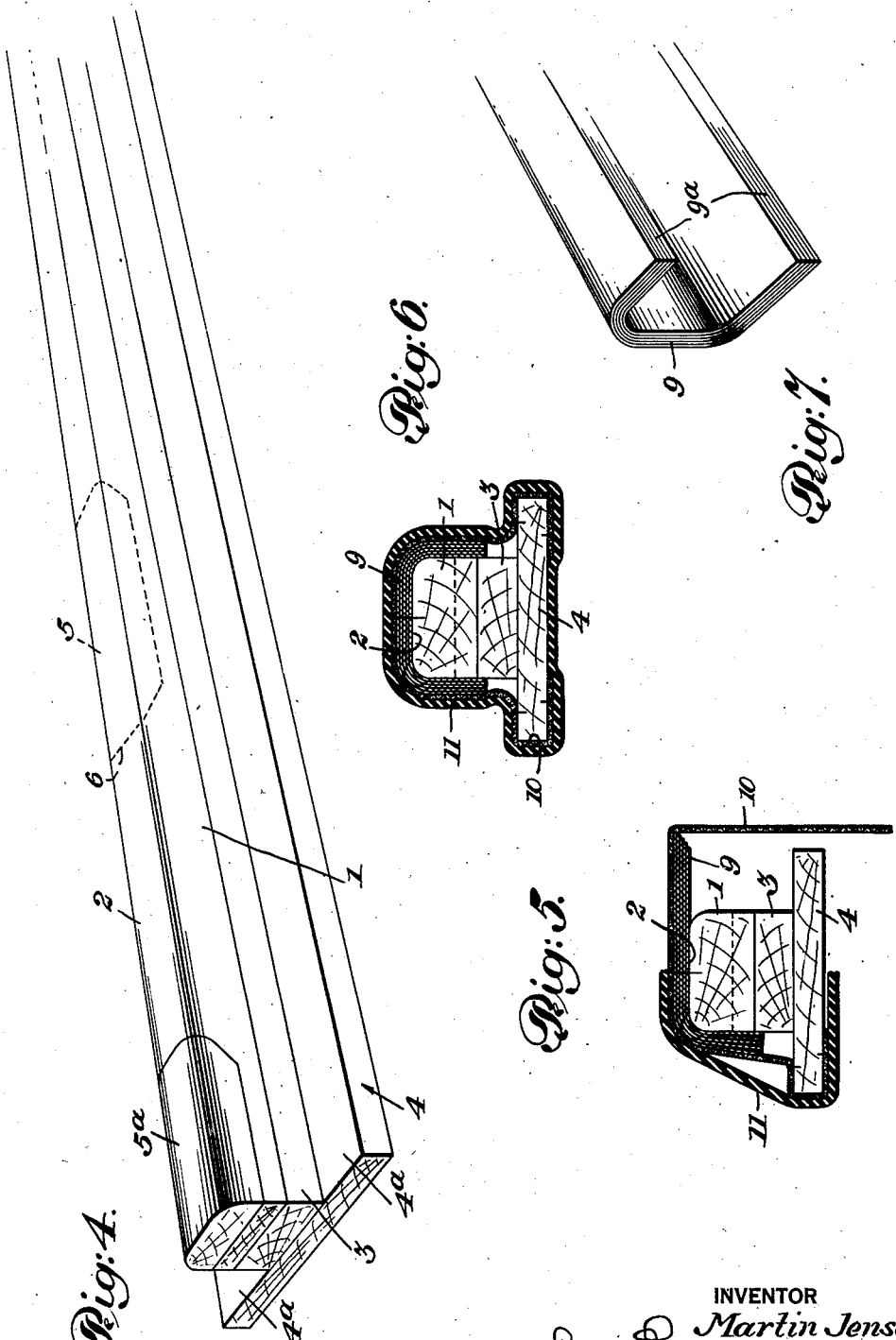
INVENTOR
Martin Jensen
BY
Louis Prevosh Whitaker
ATTORNEY

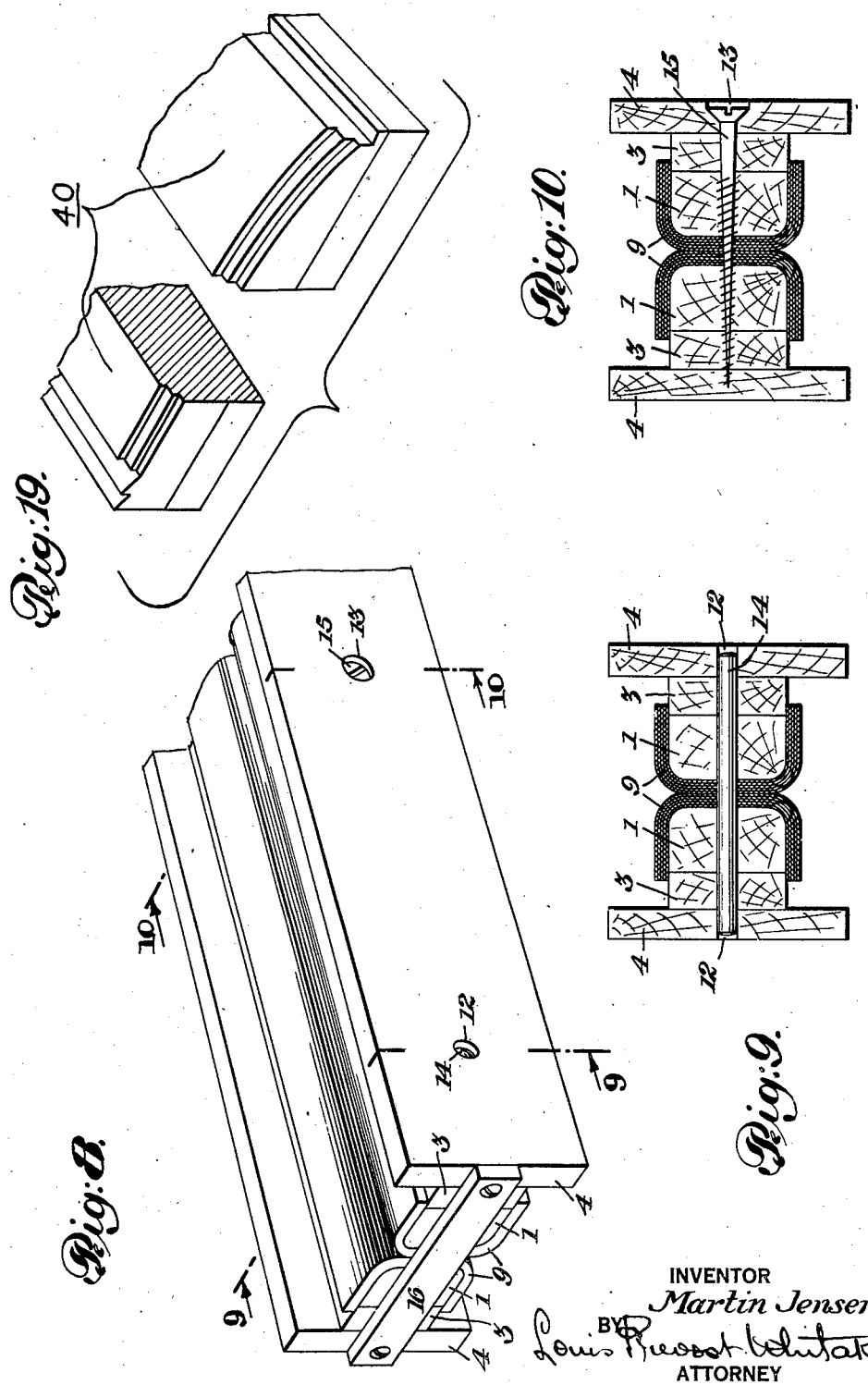

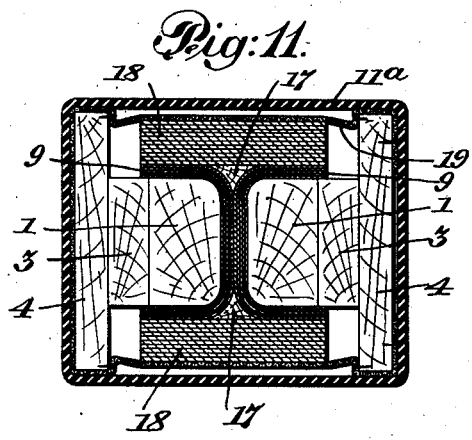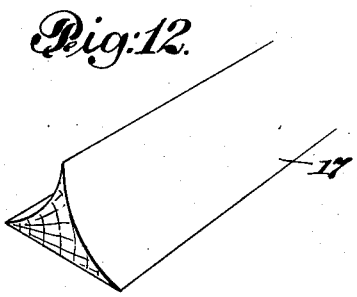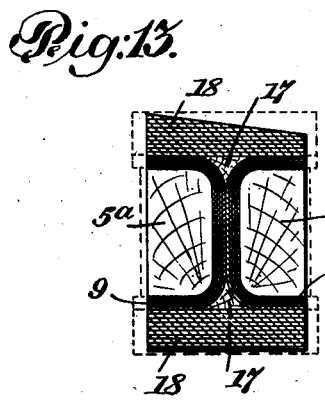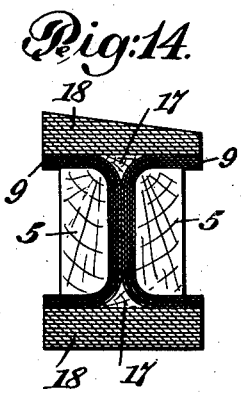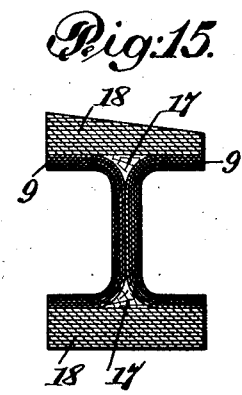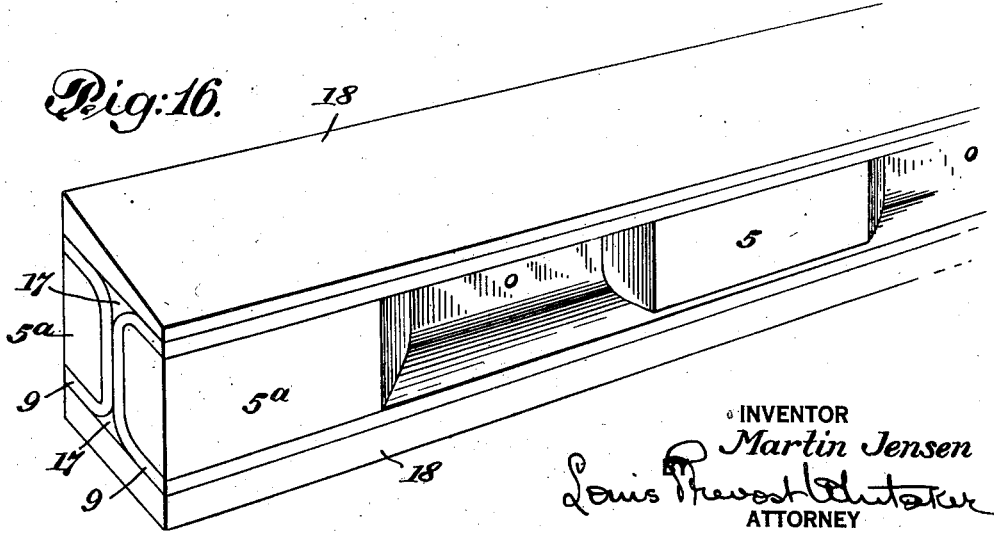

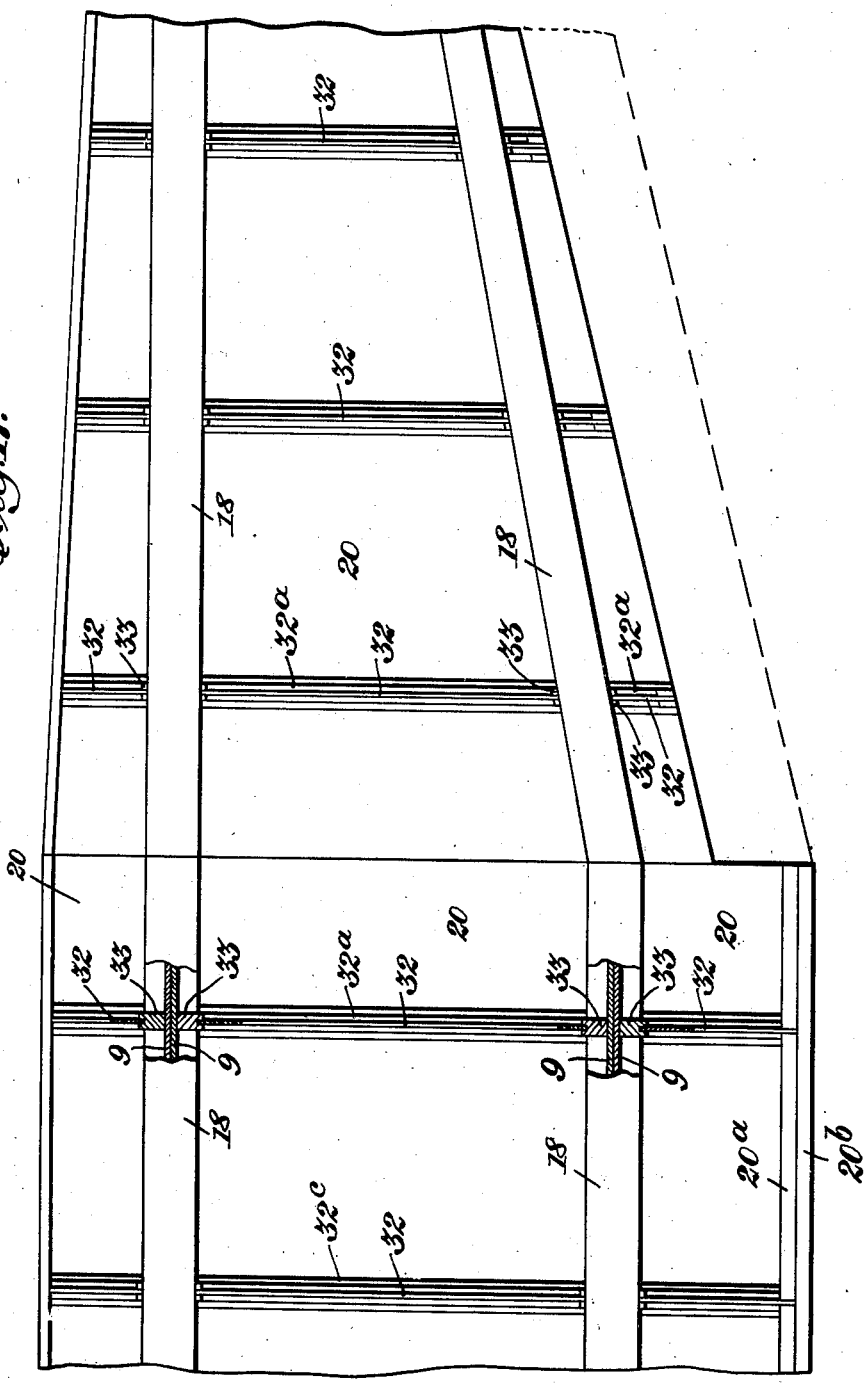

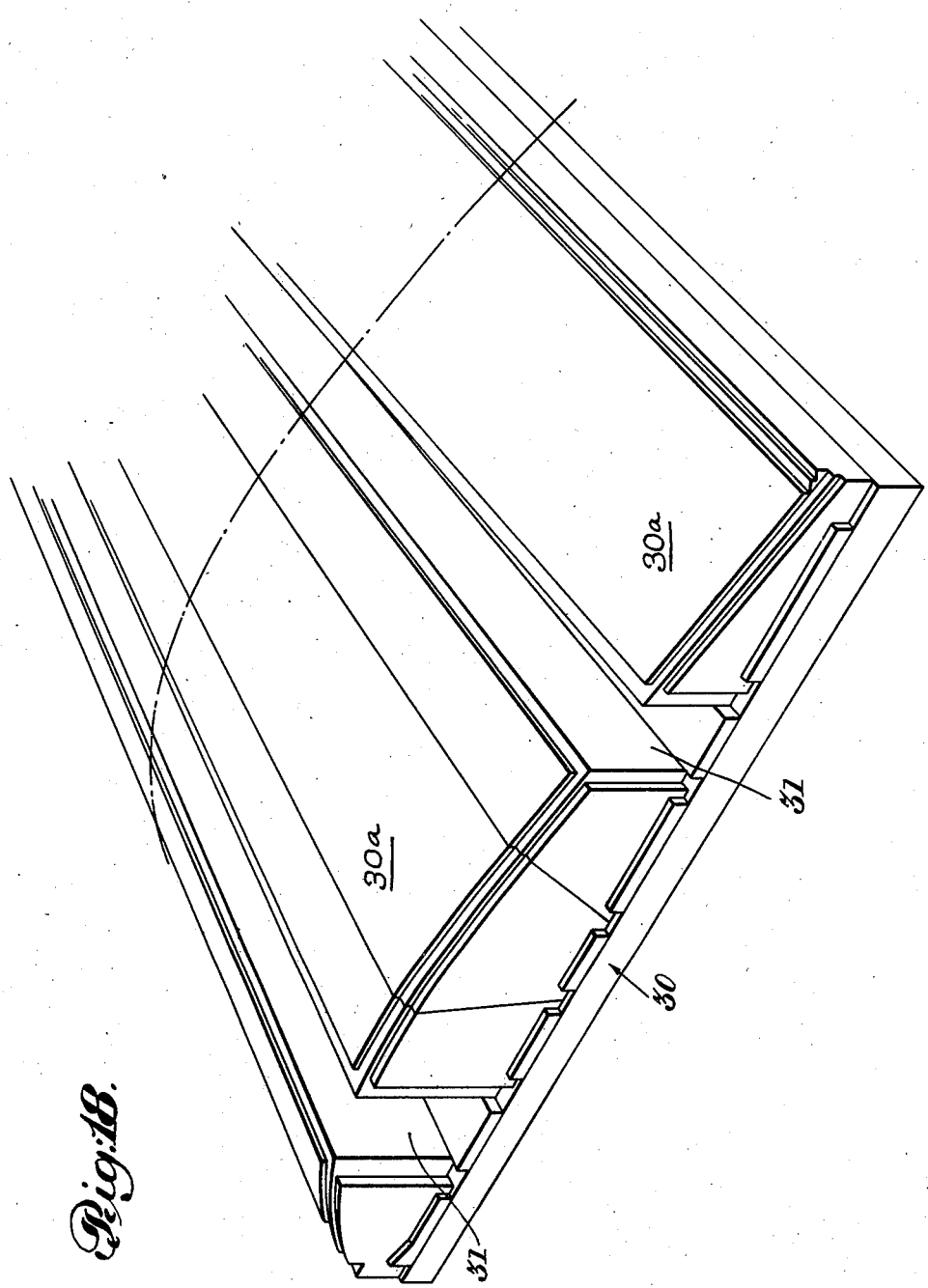

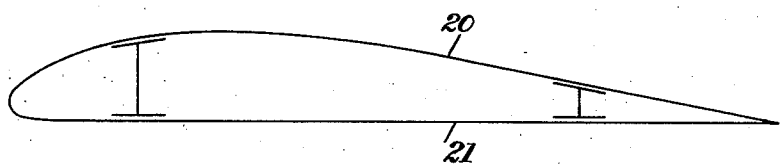
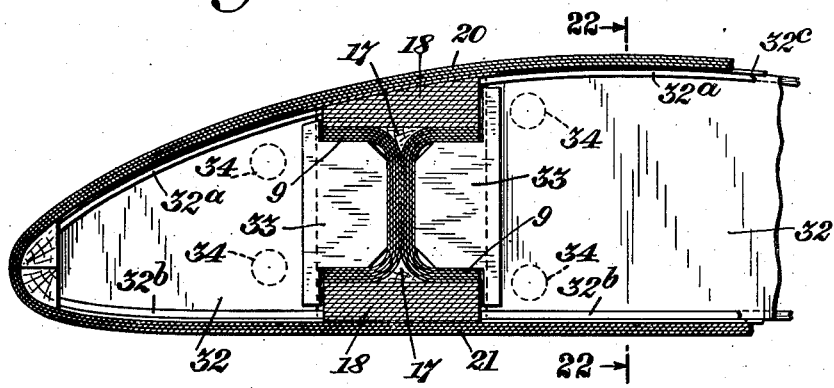
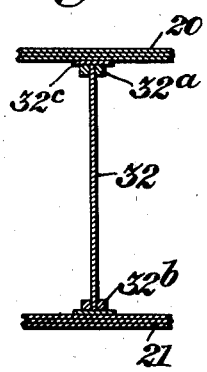
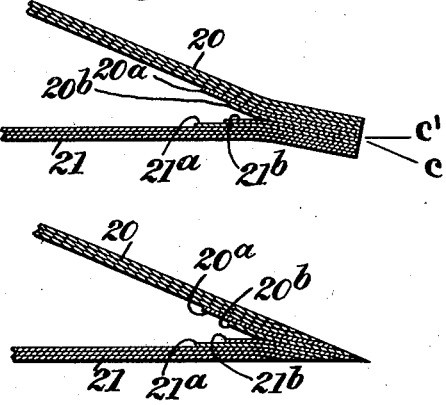

Patented Nov. 6, 1945

2,388,485

UNITED STATES PATENT OFFICE 2,388,485

METHOD OF MAKING AIRPLANE STRUCTURES

Martin Jensen, Port Washington, N. Y., assignor to Langley Aviation Corporation, New York, N. Y., a corporation of Delaware Application September 20, 1941, Serial No. 411,663

11 Claims. (Cl. 144—309)

This invention consists in the novel features hereinafter described, reference being had to the accompanying drawings which disclose one embodiment of the same, selected for purposes of illustration, and the said invention is fully disclosed in the following description and claims.

This invention comprises a novel process for the formation of articles of any desired type or form from separate pieces of veneer or other separate pieces of material by the use of a plastic for uniting the same, in the manner hereinafter described, and in certain novel constructions so formed. The invention is applicable to the formation of a wide range of articles, but finds its greatest utility in the formation of hollow bodies such as the wings and other parts of aircraft, the hulls of boats and the like, although it is not limited thereto. In the accompanying drawings, and in the following description, the invention is described in connection with the manufacture of an airplane wing, for which it is found to be peculiarly well adapted.

In carrying out the invention, various parts of the article to be manufactured are formed separately of pieces of wood, as veneer, and parts which may be other forms, the various parts having their meeting faces treated with a plastic material which is capable of being softened or melted, in situ, by the application of heat, to raise it to a critical temperature, and at the same time the parts to be immediately united are preferably subjected to pressure, so as to unite them by means of the plastic material. The invention is particularly applicable for uniting separately formed pieces which are made of plywood united by a suitable plastic.

Obviously in the production of most structures and particularly a complicated structure such as airplane wings or aerofoil, which must be suitably braced to resist strains and stresses, it follows that certain of the parts are formed and united in the manner described, which is termed for convenience, the "heat and pressure cycle," after which other parts are added and the parts so far assembled are again subjected to the heat and pressure cycle, to unite them to the previously united parts, and before the completion of the article it may have to be subjected a number of times to the heat and pressure cycle, or "cooking" as it is sometimes colloquially termed.

In the present stage of the development of plastics a considerable range of selection is possible, which changes as new plastics are brought forward, but it will be understood that there will always be one best plastic to be used in the formation of particular structures, and this is particularly true in aircraft parts formed of molded plywood united by plastic material, in which the parts must retain their rigidity and structural elasticity under temperatures varying from 170° F., which tends to soften the plastic material, and 40° F. below zero, which tends to make the plastic material brittle. It will also be obvious that the use of the same plastic for all, or substantially all, the joinings to be effected thereby is desirable, just as it is to use the same most suitable metal for a given purpose in metallic structures.

This invention is particularly applicable to the use of plastics, which, like metal, become soft and molten at a critical temperature, and again harden and solidify when cooled to, or maintained at, a temperature below the critical temperature. It will also be understood that where the plastic material is dissolved in a suitable solvent to facilitate its application, and subjected with the associated parts to successive heatings or cookings, the first heating, in addition to softening or melting the plastic material, will have the effect of driving off and expelling the solvent or solvents, if and when such are present. It is to be understood, however, that the plastic may be formed into thin sheets from which any solvents have been largely or wholly expelled, and inserted between the surfaces to be joined by the application of heat and pressure. While it is considered desirable to use the type of plastic just described, it is to be understood that the invention is not limited to plastics of this type, or any particular type, as the process may be carried out with what are termed "thermal setting plastics," in which a change takes place during or by reason of the heating to a critical temperature, with the result that the plastic material is not further affected by a subsequent subjection to the same temperature.

In carrying this invention into effect, it has been found to be desirable to employ a plastic which can be used to effect substantially all the joinings in the article to be produced, and which becomes softened or melted at a critical temperature. It follows, therefore, that as the formation of the article progresses, the application of subsequent heat and pressure cycles will in some instances tend to soften the plastic in previously formed joinings, and particular care must be taken to prevent separation or distortion. To effect a subsequent joining by the heat and pressure cycle without disturbing any previous joining so formed it has been found necessary and desirable to proceed in one or both of the following ways:

(a) Previously formed joinings may be protected by so rigidly confining the parts united by the plastic that no relative movement of such parts can occur, even if the plastic becomes softened or melted. This confinement can be effected in whole or in part by the pressure applying means, or by use of a mold or other mechanical restraining means, (b) Previously formed joinings may be insulated from the source of heat applied to effect subsequent joinings, or subjected to cooling fluids. This can be conveniently effected in many instances as the wooden parts themselves are good insulating material, and additional insulating material can be added as and when necessary, and where convenient, pipes containing a circulating cooling medium may be placed near the previous joinings during the heat and pressure cycle applied to a subsequent joining.

In the accompanying drawings, which illustrate the invention applied to the construction of an airfoil, as an airplane wing, Fig. 1 is a diagrammatic view of an airfoil comprising two airplane wings, with wing tips, and with a central body section to which they are attached.

Fig. 2 is an enlarged sectional view of one wing and the adjacent part of the central body.

Fig. 3 is a top plan view of a wing and part of the adjacent body section showing the arrangement of beams therein.

Fig. 4 is an enlarged perspective view of a pattern or mold for one U-section of the beam or spar used in the wing structure.

Fig. 5 is a sectional view taken at one end of the mold shown in Fig. 4, showing the manner of applying the veneers forming one U-section of the beam member and showing a portion of the enclosing bag used during the heat and pressure cycle.

Fig. 6 illustrates a section of the beam member when confined in the enclosing bag.

Fig. 7 is a perspective view of a portion of the U-section of the beam member which is not reinforced.

Fig. 8 is a perspective view of portions of two U-sections of the beam, united mechanically prior to a subsequent heat and pressure treatment.

Fig. 9 is a section on line 9—9 of Fig. 8.

Fig. 10 is a section on line 10—10 of Fig. 8.

Fig. 11 shows the two U-sections of the beam united and confined with lateral veneers and filler pieces, preparatory to a second heat and pressure cycle.

Fig. 12 is a detail perspective view of a portion of one of the filler pieces.

Fig. 13 is a section of the completed beam at a point where reinforcing blocks are in place to receive connecting plates to be bolted thereto to connect it with similarly reinforced portions of the body section, dotted lines showing a section of beam as originally formed before being shaped, as shown in full lines.

Fig. 14 is a sectional view of a portion of the beam with reinforcing stiffening blocks.

Fig. 15 is a similar sectional view of the beam taken at a point not provided with stiffening blocks.

Fig. 16 is a perspective view of a portion of the completed beam.

Fig. 17 is a plan view of a portion of a wing and central body section showing the beams in place, in conjunction with cross braces ready to receive the bottom portion of the wing.

Fig. 18 is a perspective view of a portion of the principal wing mold, with the wing structure including the beams and cross braces removed.

Fig. 19 is a perspective view of a portion of a mold for forming the lower skin of the wing section.

Fig. 20 is a diagrammatic sectional view of the completed wing section.

Fig. 21 is a partial sectional view of the portion of the completed wing section adjacent to the forward edge thereof.

Fig. 22 is a detail vertical section on line 22—22 of Fig. 21, showing one of the cross braces connected to adjacent portions of the upper and lower skin.

Fig. 23 is a detail sectional view of the rear edges of the upper and lower skins and adjacent reinforcing layers.

Fig. 24 is a similar view of the rear wing edge as finished.

In carrying the invention into effect, in the construction of an airplane wing, for example, a pattern bar, or mold bar, is first formed of the desired length and of the general form illustrated at 1 in Fig. 4, having a transversely curved upper surface 2, and this bar is mounted upon a spacing block 3 of the same width as the bar 1, which in turn is connected to a supporting base 4, portions 4a, 4a, of which extend on opposite sides of the bar 1. Upon this mold bar one hollow beam member composed of a plurality of layers of wood, or veneers, bent to conform to the bar 1, and securely united by plastic material, is formed. It is necessary to reinforce the hollow beam member at certain points to meet unusual stresses and for this purpose reinforcing blocks, one of which is illustrated in dotted lines at 5 are provided, which are conveniently placed in suitable recesses, as 6, so that their upper and lateral faces are flush with the corresponding surfaces of the bar 1. In some instances, for example, at the inner end of the beam section, where the completed beam is to be united to the intermediate or body section, the reinforcing block, as indicated at 5a, may fill the entire cavity of the beam section to enable the completed beam to be connected by plates 7 and bolts 8 extending through the lateral portions of the hollow beam sections and through the reinforcing blocks 5a, as indicated in Fig. 2.

The beam section is made up of a plurality of plies, three or more, of veneers 9, which are assembled on the mold bar 1 with side edges projecting laterally on both sides of the bar a distance approximately equal to the lateral projection of the portions 4a of the base, as indicated at the right hand side of Fig. 5. The contacting faces of the plies, and the contacting faces of the blocks 5 and 5a, and the adjacent portions of the engaged veneer, are treated with plastic material, as before described, which may be brushed on as a semi-liquid, or supplied in sheet form or in any other manner. The plastic which is preferably used is generally known as Butycite, but the invention is not limited thereto. Where the plastic is applied as a solution or liquid or semi-liquid, it is preferably applied to the parts separately and permitted to dry before the parts are assembled. The outer surface and other portions are not treated with plastic.

When the parts are assembled they are surrounded by a layer of canvas 10, see Figs. 5 and 6, by which the layers of veneer are partially bent around the upper and lateral portions of the bar 1, and securely held by tacking or otherwise, so as to enclose the reinforcing blocks 5, 5a, etc., and the canvas is preferably carried around the base and secured thereto, as indicated in Figs. 5 and 6, and the entire assembly is then subjected to the heat and pressure cycle. It will be understood that where parts are brought into contact, which are not to be adhesively connected to contiguous parts of the article, or to adjacent parts of the mold, or the canvas covering or bag, one of such contacting faces may conveniently be coated with a cellulose acetate, or other suitable material to prevent adhesion and allowed to dry. In practice the outer layer of veneer is frequently not covered with the plastic to prevent it from sticking to the canvas wrapping or to the bag, hereinafter referred to. If an outer layer or coating of plastic is desired, it is preferably covered with a protecting coating of Cellophane or other suitable material which can be readily removed. It is preferred also to treat the surfaces of the molds, herein referred to, or such portions of them as may be desirable, with cellulose acetate or like material to prevent a good bond between mold and adjacent veneer, by any plastic which may bleed through the veneer, but this would not prevent the adjacent veneer from sticking to the mold if the outer surface of the veneer were coated with plastic, and in such case a protecting covering of Cellophane or like easily removable material is preferred.

The assembled parts are preferably inserted in an impervious bag, indicated at 11, and sealed therein, the bag, however, being provided with an outlet pipe or passage for permitting the air within the bag to be drawn out by a vacuum connection, or to escape into the atmosphere. The bag and its contents is then placed in a pressure chamber, where it is subjected to heat and pressure, for example, by steam or steam and compressed air, so as to raise the temperature to melt the plastic, while the pressure exterior to the bag will be applied uniformly to the assembly within the bag and force them firmly and hold them until the plastic is set. It will be seen that the laterally projecting portions 4a of the supporting base 4 tend initially to hold the adjacent portions of the bag out away from the lateral faces of the mold bar 1, so that pressure is applied first to the central portion of the plies on top of the mold bar and then progressively toward the lateral edges of the plies. The setting of the plastic may be expedited by the use of cold fluid, as water, without reducing the pressure, as by introducing cold water into the pressure chamber. As soon as the plastic is set, the bag is removed from the chamber, and the assembled parts are removed from the bag, and the assembled parts of the beam member are removed from the bar 1, leaving the beam member in the form shown in section in Fig. 7, except where the blocks 5, 5a are united to the veneers, as previously described. The edges of the bent or lateral portions of the veneers are preferably trimmed by sawing, as indicated at 9a in Fig. 7.

To form the beam, the beam members are covered on their exterior faces with plastic while still associated with the spacing strips 3, and base boards 4, are provided with aligning holes 12, and screw holes 13, which are conveniently alternated lengthwise, and the beam members are aligned by means of dowel pins 14 engaging the apertures 12, see Fig. 9, and are rigidly united back to back by plastic material and by long screws 15, see Fig. 10. The base boards 4, 4, may also be connected as by strips 16, see Fig. 8.

Longitudinal filling strips 17, see Fig. 12, preferably of soft, slightly compressible wood, are placed on each side of the assembled parts, to fit the spaces formed adjacent to the curved portions of the veneers 9, the contiguous faces being provided with plastic, and a plurality of longitudinally extending veneers 18, the contiguous faces of which are treated with the plastic are located on opposite sides of the beam members and held in place by canvas, indicated at 19, Fig. 11, the inner face of the innermost veneer of each group 18 and the contiguous lateral faces of the beam members and the outermost faces of the filling strips 17 being also provided with the plastic material. The outer faces of veneers are preferably not treated with plastic.

The assembled beam parts, as indicated in Fig. 11, are then placed in an impervious bag, indicated at 11a, and subjected in a suitable tank or closed chamber to the heat and pressure cycle, as previously described. It will be noted that during this heat and pressure cycle the plastic which was acted on by the previous heat and pressure cycles to form the parts of the beam members, may be again heated to the critical temperature, but these parts will be so rigidly confined that no relative movement of the parts of the beam members can possibly take place, and the same plastic material can be used to effect the subsequent joining of the assembled prefabricated parts constituting the complete beam, after which the beam is cooled as before described and removed from the bag. The spacing blocks 3 and base pieces 4 can then be removed together with the dowels 14 and screws 15, leaving the beam in substantially the form shown in dotted lines in Fig. 13, and possessed of great strength while being comparatively light.

By reference to Fig. 20, it will be noted that each wing embodies preferably two of these beams, the upper and lower surfaces of which conform to the shape of the upper skin 20 and lower skin 21, and after the beams are completed they are trimmed by sawing, planing, or otherwise, to bring their upper and lower faces to the exact form to engage the upper and lower skins of the wing, or aerofoil of which they are to form a part.

Figs. 13, 14 and 15 show sections of the beam at different points. Figs. 13 and 14 show the reinforcing blocks 5a and 5 respectively, also shown in Fig. 16, and Fig. 15 being a section where no reinforcing blocks are employed. The beams are preferably tapered somewhat from their inner to their outer ends, as indicated in Fig. 2, and the beams may be tapered to the desired extent by trimming their side portions, as indicated in Fig. 3.

The beams are assembled in connection with the upper skin or wall of the wing and suitable cross braces, by means of a form or mold 30, illustrated in Figs. 17 and 18, in which recesses 31 are provided for holding the beams in position with respect to vertically disposed braces 32 supported with their ends in engagement with grooved blocks 33, seated at proper intervals in the opposite concave portions of the beams. The upper faces of the beams and braces, and the engaged surfaces of the braces and blocks 33, are treated with the plastic material. The upper skin or wall 20 of the wing is formed of three or more plies of veneer and given the desired curvature, indicated in Figs. 20 and 21, in any suitable way. This upper skin or wall is preferably provided with strips 32c to engage the upper edges of braces 32. These strips 32c are provided with filler strips 32a, 32a, to hold the braces in proper alignment, and the mold 30 is made in a plurality of sections 30a, as shown in Fig. 18, to permit the proper placing of these braces. The molds for the upper and lower skins are divided crosswise at their length into a plurality of sections, the lines of division being indicated diagrammatically by the dot and dash lines in Figs. 18 and 19. The ends of the braces 32 preferably engage grooved vertically disposed blocks 33, secured to opposite sides of the beams, as indicated in Fig. 17. The mold 30, together with the parts assembled in connection therewith, is then subjected to the heat and pressure treatment, by placing it in a bag, as before described, and subjecting them to heat and pressure in a suitable pressure chamber, to unite the beams and braces with the upper skin of the wing. Under ordinary conditions the previously formed plastic unions will be sufficiently insulated from the heat applied to the joints between the upper skin and the upper faces of the beams and cross braces, so that during the ensuing heat and pressure cycle the plastic material of the previously formed joints will not be raised to the critical temperature and will not be affected, as the wood parts of the mold being a poor conductor of heat, contributes to their insulation. However, if found necessary, the previously formed joinings may be treated with a cooling fluid circulated through pipes indicated in dotted lines at 34, in Fig. 21, extending through apertures in the cross braces 32. Flexible rubber pipes may be employed and removed after the heat and pressure cycle is completed and the wing structure cooled.

The wing structure is completed by molding the lower skin or wall 21 on the mold 40 and thereafter attaching the lower skin to the lower edges of the upper skin, and to the lower faces of the beams and cross braces, after removal from the mold 30. The upper face of the lower skin is preferably provided with strips 32c to engage the lower edges of the braces 32, to which strips the filler strips 32b are secured on opposite sides of the braces. The lower skin can be secured by mechanical fastenings or by suitable plastic material, using local heat and local pressure, without however employing the heat and pressure cycle hereinbefore described, which requires the use of a mold. Pressure may be locally applied to the parts at the points of union by clamps or other suitable means. Heat may be applied locally at the necessary points by means of heated fluid circulated through flexible pipes, or otherwise, or electric heating units of any desired character may be employed.

In connection with the completion of the wing by the application of the lower skin or wall, it is highly important that a streamline rear edge must be provided for the wing to facilitate its free passage through air. In order to accomplish this desirable result, the inner face of the upper skin is provided along the rear edge with a plurality of additional strips of veneer, indicated at 20a and 20b, for example in Fig. 23, and the rear edge of the skin is curved upwardly as shown, the strip 20 is of greater width than the strip 20b, and there may be two or more of such strips.

The lower skin or wall 21 is also provided with similar reinforcing strips 21a and 21b at its rear edge, as also shown in Fig. 23, and the rear edge of the lower skin is bent downwardly. The construction is such that the three or more plies forming the upper skin, and those forming the lower skin, and the reinforcing strips of both skins at their rear edges, are brought into substantial parallelism, as shown in Fig. 23, thus constituting a considerable thickness at the rear edge of the skin. This lapped portion of the rear edge of the wing is then trimmed in planes indicated by dotted lines c, c, and c', c', in direct alignment respectively with the upper surface of the upper skin and the lower surface of the lower skin, thus forming a sharp edge at the rear of the wing by the meeting of surfaces in exact alignment with the adjacent portions of the upper and lower surfaces of the wing, and enabling the wings to leave the air without setting up any appreciable commotion therein, while a bond of necessary strength and rigidity of the rear edge of the wing is insured.

It will be obvious that while the specific structure of the wing and the parts thereof are of peculiar advantage and desirability as well as novelty, the process herein disclosed may, by slight variations, be employed for the manufacture of other aerofoils and other articles, and it is desired to claim it for all purposes for which it may be found desirable. It will be understood that wherever a plurality of plies of veneer or like materials are united by plastic as previously described, the grain of the several plies may be arranged to extend angularly to the grain of adjacent plies, wherever this may be desirable or advantageous.

What I claim and desire to secure by Letters Patent is:

1. The herein described process of forming a hollow beam for aircraft parts and the like, which consists in providing a mold bar having a transversely curved longitudinal face, provided with recesses at intervals therein, extending the full width of the bar, locating removable reinforcing blocks in said recesses with exterior faces flush with corresponding faces of the bar, bending a plurality of plies of veneer around the curved face and contiguous side faces of said bar and blocks, with plastic material between the said plies, and between said plies and said blocks, holding said parts in assembled relation and subjecting them to a heat and pressure cycle to form a beam member open at one side and having said blocks permanently united thereto within the hollow portions thereof, and removing the mold bar from said plies and reinforcing blocks laterally from the beam member, forming a second beam member in like manner, placing said beam members back to back, inserting filling strips in contact with the opposite curved portions of the said beam members on opposite sides of the beam, applying a plurality of plies of veneer on each side of the beam exterior to said filling strips, with plastic material between contacting surfaces of said parts, holding said parts in assembled relation, and temporarily confining said previously joined parts to prevent relative movement, and subjecting said parts so assembled to a heat and pressure cycle to permanently unite them.

2. The herein described process of making an aerofoil or the like, which consists in holding in rigid relation a plurality of longitudinally disposed beams, each comprising two members, composed of transversely bent plies of veneer united by plastic material and heat and pressure, to form a hollow member open at one side reinforcing blocks inserted in the open side of said beams, said beam members being united directly to each other and to associated filling strips and lateral plies of veneer by plastic material and heat and pressure, and securing transversely and vertically disposed braces to said beams with plastic material between contacting faces, the upper and lower faces of said beams and braces being respectively in the planes of the inner faces of the top and bottom sections of the aerofoil, placing one of said sections in engagement with the adjacent faces of the beams and braces, with plastic material between them, subjecting the assembled parts to a heat and pressure cycle to unite said parts, and protecting parts previously joined by said plastic material against relative movement during said heat and pressure cycle, and subsequently securing the other of said sections to the previously assembled and united parts.

3. The herein described process of making an aerofoil or the like, which consists in holding in rigid relation a plurality of longitudinally disposed beams, each comprising two members, composed of transversely bent plies of veneer united by plastic material and heat and pressure, to form a hollow member open at one side, said beam members being united to each other and to associated filling strips and lateral plies of veneer by plastic material and heat and pressure, and securing transversely and vertically disposed braces to said beams with plastic material between contacting faces, the upper and lower faces of said beams and braces being respectively in the planes of the inner faces of the top and bottom sections of the aerofoil, placing one of said sections in engagement with the adjacent faces of the beams and braces, with plastic material between them, subjecting the assembled parts to a heat and pressure cycle to unite said parts, and introducing cooling material into the interior of said aerofoil adjacent to said parts previously joined by said plastic material and heat and pressure cycle, to prevent relative movement of said previously joined parts during the subsequent heat and pressure cycle, and subsequently applying and securing the other of said sections to the previously assembled and united parts.

4. The herein described process of forming structures composed of a plurality of separately formed parts united by thermoplastic adhesive having a critical softening temperature, which comprises assembling a plurality of laminae with thermoplastic adhesive therebetween, applying heat and pressure to bond said laminae together and mold them to predetermined shape to form a part of said structure, and thereafter uniting said part with other parts by assembling said parts with thermoplastic adhesive therebetween, and subjecting said assembly to a further heat and pressure cycle with temperatures above said critical temperature while maintaining said bond between the previously joined laminae during said subsequent joining.

5. The herein described process of forming structures composed of a plurality of separately formed parts united by thermoplastic adhesive having a critical softening temperature, which comprises assembling a plurality of laminae with thermoplastic adhesive therebetween, applying heat and pressure to bond said laminae together and mold them to predetermined shape to form a part of said structure, thereafter uniting said part with other parts by assembling said parts with thermoplastic adhesive therebetween and holding them in predetermined relation while subjecting said assembly to a further heat and pressure cycle with temperatures above said critical temperature, and confining said previously formed part to maintain said molded shape of said laminae and the bond between the laminae.

6. The herein described process of forming structures composed of a plurality of separately formed parts united by thermoplastic adhesive having a critical softening temperature, which comprises assembling a plurality of laminae with thermoplastic adhesive therebetween, applying heat and pressure to bond said laminae together and mold them to predetermined shape to form a part of said structure, thereafter uniting said part with other parts by assembling said parts with thermoplastic adhesive therebetween and maintaining them in predetermined relation, and subjecting said assembly to a further heat and pressure cycle to bond said parts while maintaining the plastic material of the previously joined laminae below said critical temperature to prevent relative movement of the previously joined laminae during the subsequent heating of the assembly.

7. The herein described process of forming structures composed of a plurality of separately formed parts united by thermoplastic adhesive having a critical softening temperature, which comprises assembling a plurality of laminae with thermoplastic adhesive therebetween, applying heat and pressure to bond said laminae together and mold them to predetermined shape to form a part of said structure, thereafter uniting said part with other parts by assembling said parts with thermoplastic adhesive therebetween and maintaining them in predetermined relation, subjecting said assembly to a further heat and pressure cycle to bond said parts together, and insulating the plastic material of the previously joined laminae to maintain it below said critical temperature and prevent the relative movement of the previously joined laminae during the subsequent heating.

8. The herein described process of forming structures composed of a plurality of separately formed parts united by thermoplastic adhesive having a critical softening temperature, which comprises assembling a plurality of laminae with thermoplastic adhesive therebetween, applying heat and pressure to bond said laminae together and mold them to predetermined shape to form a part of said structure, thereafter uniting said part with other parts by assembling said parts with thermoplastic adhesive therebetween and maintaining them in predetermined relation, subjecting said assembly to a further heat and pressure cycle to bond said parts together while subjecting said previously joined laminae to a cooling medium to maintain the plastic material bonding said previously joined laminae below its critical temperature, and prevent separation of the laminae during the subsequent heating of the assembly.

9. The herein described process of forming a beam for aircraft parts and the like, which comprises assembling a plurality of plies of veneer on a mold bar with plastic adhesive between said said plies, holding said plies in relation to said bar, subjecting the assembled parts to a heat and pressure cycle to unite said plies and to mold them around three sides of the mold bar to form a beam member open at one side, forming a second beam member in like manner, placing said beam members back to back with thermoplastic material between their contacting faces, holding said beam members rigidly in alignment and preventing relative movement of their constituent parts, and subjecting said beam members to a further heat and pressure cycle to rigidly and permanently unite them.

10. The herein described process of forming a beam for aircraft parts and the like, which comprises assembling a plurality of plies of veneer on a mold bar, holding them in relation to said mold bar, subjecting the assembled parts to a heat and pressure cycle to unite said plies and to mold them around three sides of the mold bar to form a beam member open at one side, forming a second beam member in like manner, placing said beam members back to back with thermoplastic material between their contacting faces and with the respective mold bars in place within the hollow portions of said beam members, temporarily securing said mold bars together to hold said beam members rigidly in alignment and to prevent relative movement of their constituent parts, and subjecting said beam members to a further heat and pressure cycle to rigidly and permanently unite them into a unitary beam structure.

11. The herein described process of forming a hollow beam member for aircraft parts and the like, which consists in providing a mold bar having a laterally projecting base portion and having a transversely curved longitudinal face, provided with recesses at intervals therein, extending the full width of the bar, locating removable reinforcing blocks extending longitudinally of the mold bar in said recesses with exterior faces flush with corresponding faces of the bar, assembling a plurality of plies of veneer on said mold bar with portions projecting laterally on both sides of said bar a distance approximately equal to the lateral projection of said base, and with thermoplastic adhesive between said plies and between said plies and said blocks, covering said assembled plies with a layer of strong flexible fabric material extending over the top of said plies and out over the laterally projecting portions of said plies and of said base and securely held beneath said base, and applying heat and fluid pressure progressively from the center toward the lateral edges of said plies, to mold said plies into conformity with three sides of said mold bar and with said blocks, and to permanently unite said plies and said blocks to form a beam member open at one side and having said blocks permanently united thereto within the hollow portions thereof, and thereafter removing the mold bar laterally from said plies and reinforcing blocks.

MARTIN JENSEN.